United States Patent
Landcastle et al.

(10) Patent No.: US 9,863,594 B2
(45) Date of Patent: Jan. 9, 2018

(54) VEHICLE HEADLAMP AND LIGHT-INJECTING ACCENT LAMP COMBINATION AND METHOD

(71) Applicants: Craig Landcastle, Bow, NH (US); Michael Frappier, Concord, NH (US); Richard Holland, Stoddard, NH (US); Min Huang, Hillsboro, NH (US); Jason Lessard, Bow, NH (US)

(72) Inventors: Craig Landcastle, Bow, NH (US); Michael Frappier, Concord, NH (US); Richard Holland, Stoddard, NH (US); Min Huang, Hillsboro, NH (US); Jason Lessard, Bow, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 162 days.

(21) Appl. No.: 14/931,362

(22) Filed: Nov. 3, 2015

(65) Prior Publication Data
US 2017/0122513 A1   May 4, 2017

(51) Int. Cl.
*F21S 8/10* (2006.01)
*B60Q 1/00* (2006.01)
(Continued)

(52) U.S. Cl.
CPC ........ *F21S 48/1109* (2013.01); *B60Q 1/0058* (2013.01); *F21S 48/1113* (2013.01);
(Continued)

(58) Field of Classification Search
CPC ............... F21S 48/1109; F21S 48/1113; F21S 48/1122; F21S 48/1104; B60Q 1/0058
See application file for complete search history.

(56) References Cited

U.S. PATENT DOCUMENTS 2,041,189 A    5/1936  Keating et al.
3,769,663 A   11/1973  Ped
(Continued)

FOREIGN PATENT DOCUMENTS

CN   101619829    1/2010
DE   10 38 499 B  9/1958
(Continued)

OTHER PUBLICATIONS

Search Report for European Patent Application No. 16196835.9 (4 pages).
(Continued)

*Primary Examiner* — Andrew Coughlin
*Assistant Examiner* — Christopher E Dunay
(74) *Attorney, Agent, or Firm* — Edward S. Podszus (57) ABSTRACT

An accent lamp (10) having a solid state light source (4), such as LEDs, is attachable to a rear surface of an automotive headlamp (40) opposite the light-generating capsule (44). Accent lamp (10) has first retaining member (20), such as a clamp, formed above printed circuit board (8) on which LED (4) is mounted. Headlamp base (60) defines light passageway (45), formed as a light guide (42), extending from outermost peripheral surface (63) to an upper surface (61) on which lamp capsule (44) is retained. Accent lamp (10) is readily detachably mounted to headlamp (40), preferably by resilient first and second retaining members (20, 24), and, when mounted, can be biased to promote optical coupling of light source (4) to light guide (42).

19 Claims, 11 Drawing Sheets

(51) Int. Cl.
*F21Y 115/10* (2016.01)
*F21Y 113/20* (2016.01)

(52) U.S. Cl.
CPC ....... *F21S 48/1168* (2013.01); *F21S 48/1225* (2013.01); *F21S 48/212* (2013.01); *F21S 48/215* (2013.01); *F21S 48/2212* (2013.01); *F21S 48/2237* (2013.01); *F21S 48/2262* (2013.01); *F21S 48/2287* (2013.01); *F21S 48/328* (2013.01); *B60Q 2900/10* (2013.01); *F21Y 2113/20* (2016.08); *F21Y 2115/10* (2016.08)

(56) References Cited

U.S. PATENT DOCUMENTS

| | | | |
|---|---|---|---|
| 4,500,946 A * | 2/1985 | Mikola | F21S 48/1109 362/267 |
| 4,609,977 A | 9/1986 | Eckhardt et al. | |
| 4,751,421 A | 6/1988 | Braun et al. | |
| 4,851,976 A * | 7/1989 | McMahan | F21S 48/1113 362/306 |
| 5,411,407 A * | 5/1995 | Thomas | F21S 48/1109 439/271 |
| 5,618,097 A * | 4/1997 | Coushaine | F21S 48/1113 362/285 |
| 5,685,637 A | 11/1997 | Chapman et al. | |
| 5,696,424 A | 12/1997 | Coushaine | |
| 5,855,430 A | 1/1999 | Coushaine et al. | |
| 5,911,367 A | 6/1999 | McInerney | |
| 5,984,494 A | 11/1999 | Chapman et al. | |
| 6,080,019 A | 6/2000 | Coushaine | |
| 6,082,883 A * | 7/2000 | Tatsumi | F21S 48/1109 362/519 |
| 6,254,252 B1 | 7/2001 | Coushaine et al. | |
| 6,270,235 B1 | 8/2001 | Coushaine | |
| 6,280,049 B1 | 8/2001 | Tam | |
| 6,338,647 B1 | 1/2002 | Fernandez et al. | |
| 6,425,678 B1 | 7/2002 | Verdes et al. | |
| 6,447,155 B2 | 9/2002 | Kondo et al. | |
| 6,756,893 B1 | 6/2004 | Fernandez | |
| 6,909,239 B2 | 6/2005 | Gauna | |
| 7,008,096 B1 | 3/2006 | Coushaine et al. | |
| 7,040,783 B1 | 5/2006 | Christianson | |
| 7,118,241 B2 | 10/2006 | Sohn | |
| 7,160,012 B2 | 1/2007 | Hilscher et al. | |
| 7,261,451 B2 | 8/2007 | Coushaine et al. | |
| 7,417,364 B2 | 8/2008 | Wegman et al. | |
| 7,661,818 B2 | 2/2010 | Waters | |
| 7,905,639 B2 | 3/2011 | Luo et al. | |
| 8,047,671 B2 | 11/2011 | Fan et al. | |
| 2001/0000686 A1 | 5/2001 | Coushaine | |
| 2004/0264187 A1 | 12/2004 | Vanderschuit | |
| 2007/0076426 A1 | 4/2007 | Kling et al. | |
| 2007/0139945 A1 * | 6/2007 | Maliar | F21S 48/1109 362/509 |
| 2008/0117647 A1 * | 5/2008 | Behr | F21S 48/1109 362/547 |
| 2010/0213814 A1 | 8/2010 | Seymour et al. | |
| 2010/0213815 A1 * | 8/2010 | Aghamehdi | H01J 5/54 313/318.01 |
| 2011/0069481 A1 | 3/2011 | Chen | |
| 2012/0170286 A1 * | 7/2012 | Bodem | F21S 48/212 362/362 |
| 2012/0256552 A1 * | 10/2012 | Chiu | H05B 41/2928 315/200 R |
| 2013/0272010 A1 * | 10/2013 | Kawamura | F21S 48/00 362/519 |
| 2013/0294056 A1 | 11/2013 | Eibner et al. | |
| 2016/0053956 A1 * | 2/2016 | Toyoyama | F21S 48/1113 362/548 |
| 2016/0290621 A1 * | 10/2016 | Ozawa | F21V 29/74 |

FOREIGN PATENT DOCUMENTS

| | | |
|---|---|---|
| DE | 25 37 458 A1 | 3/1997 |
| DE | 102 27 173 A1 | 1/2004 |
| GB | 266 366 A | 6/1927 |
| GB | 1 517 635 A | 7/1978 |
| JP | 2004-178997 A | 6/2004 |
| JP | 2006092922 | 4/2006 |
| KR | 2013 0114360 A | 10/2013 |
| WO | 2008121883 A1 | 10/2008 |
| WO | 2009011562 A2 | 1/2009 |
| WO | 2010030336 A1 | 3/2010 |

OTHER PUBLICATIONS

English Abstract of JP2004178997(A) obtained from Espacenet on Apr. 24, 2017 (2 pages).
Excerpt of SAE (Society of Automotive Engineers) Tech. Spec. J2560, issued Jul. 2007 (pp. 41-56).
English Abstract of CN 101619829-A obtained from Espacenet website on Nov. 11, 2015 (2 pages).
Machine translation of JP 2006-092922 (Pub. Date Jun. 4, 2006) obtained from website astamuse.com (18 pages, unnumbered).
Assignee's pending U.S. Appl. No. 14/931,389, co-filed Nov. 3, 2015 for "Attachable Vehicle Accent Lamp" (inventor Lessard).
Assignee's pending U.S. Appl. No. 14/931,334, co-filed Nov. 3, 2015 for "Vehicle Headlamp with Light Passage" (inventors Landcastle, Frappier, Holland, Huang).

* cited by examiner

| DIMENSION | INCHES | MILLIMETERS |
|---|---|---|
| GA | 0.591 MAX/0.217 MIN | 15.00 MAX/5.50 MIN |
| GB | 0.236 | 6.00 |
| GC | 45 DEG | 45 DEG |
| GD | 0.079 | 2.00 |
| GE | 1.09 | 27.8 |
| GF | 0.165 | 4.20 |
| GG | 0.346 | 8.80 |
| GH | 0.433 | 11.00 |
| GI | 0.053 | 1.40 |
| GJ | 0.217 ± 0.006 | 5.50 ± 0.15 |
| GK | 0.06 | 1.5 |
| GL | 0.775 DIAMETER | 19.68 DIAMETER |
| GM | 2.165 | 55.00 |
| GN | 0.093 | 2.36 |
| GO | 0.157 | 4.00 |
| GP | 45 DEG CHAMFER | 45 DEG CHAMFER |
| GQ | 0.039 | 1.00 |
| GR | 0.787 ± 0.002 DIAMETER | 20.00 ± 0.05 DIAMETER |
| GS | 0.138 | 3.50 |
| GT | 0.687 +0.004/-0.000 DIAMETER | 17.46+0.10/-0.000 DIAMETER |
| GU | 0.079 | 2.00 |
| GV | 0.138 | 3.5 |
| GW | 0.209 MIN | 5.30 MIN |
| GX | 0.378 | 9.60 |

DIMENSIONS SHOWN ARE MAXIMUM-MAY BE SMALLER

BULBS MUST BE EQUIPPED WITH A SEAL. THE BULB-SEAL ASSEMBLY MUST WITHSTAND A MINIMUM OF 70 KPA (10psig) WHEN THE ASSEMBLY IS INSERTED INTO A CYLINDRICAL APERTURE OF 20.22 ± 0.10 mm (0.796 ± 0.004 IN)

SEE FIG 18

DIAMETERS MUST BE CONCENTRIC WITHIN 0.20 mm (0.008 in)

GLASS BULB PERIPHERY MUST BE OPTICALLY DISTORTION FREE AXIALLY WITHIN THE INCLUDED ANGLES ABOUT POINT B

KEY AND KEYWAY ARE OPTIONAL CONSTRUCTION. KEYWAY REQUIRED FOR AFTERMARKET ONLY.

MEASURED AT THE TERMINAL BASE. TERMINALS MUST BE PERPENDICULAR TO THE BASE AND PARALLEL WITHIN ±1.5 DEG

DIAMETERS MUST BE CONCENTRIC WITHIN 0.20 mm (0.008 in)

ABSOLUTE DIMENSION. NO TOLERANCE

GLASS CAPSULE AND SUPPORTS SHALL NOT EXCEED THIS ENVELOPE AND SHALL NOT INTERFERE WITH INSERTION PAST THE LAMPS KEY.

THE REFERENCE PLANE IS DETERMINED BY THREE (3) SUPPORTING BOSSES OF OPTIONAL SCHEMES OR A CONTINUOUS SURFACE.

| TOLERANCES UNLESS OTHERWISE SPECIFIED | |
|---|---|
| INCHES | MILLIMETERS |
| 2 PLACE DECIMALS ± 0.02 | 1 PLACE DECIMALS ± 0.05 |
| 3 PLACE DECIMALS ± 0.010 | 2 PLACE DECIMALS ± 0.030 |
| ANGULAR ± 1 DEG | ANGULAR ± 1 DEG |

PRIOR ART

FIG. 12B

VEHICLE HEADLAMP AND LIGHT-INJECTING ACCENT LAMP COMBINATION AND METHOD

CROSS REFERENCE TO RELATED APPLICATIONS

N/A

TECHNICAL FIELD

The present disclosure relates to light sources to an accent (ornamental or auxiliary) lamp and lighting apparatus, particularly for use with a motor vehicle.

BACKGROUND AND ACKNOWLEDGED PRIOR ART

The following vehicle lamps of Applicant's assignee are known, and are each incorporated here in their entirety as if fully set forth herein: U.S. Pat. No. 7,008,096 (Coushaine); U.S. Pat. No. 7,261,451 (Coushaine); U.S. Pat. No. 6,080,019 (Coushaine); U.S. Pat. No. 6,270,235 (Coushaine); U.S. Pat. No. 6,254,252 (Coushaine); U.S. Pat. No. 5,696,424 (Coushaine); and US Pat. Pub. US2010/0213815 (Aghamehdi). Also known is the vehicle lamp of Applicant's assignee's affiliate U.S. Pat. No. 4,751,421 (Braun) which is also incorporated here in its entirety as if fully set forth herein.

Commercial embodiments of headlamps of the type shown in U.S. Pat. No. 6,080,019 (Coushaine) at FIGS. 1-5 are known and are generally designated in the trade as, for example, type 9005 or 9006 headlamps. With reference to Coushaine Pat. '019 at FIG. 1 depicting sealing cover 14 or FIGS. 3-4 depicting sealing cover 114 and at column 4, lines 55-column 5, line 1 discussing affixation of cover 114 and silicone sealant, it is known in commercial SAE type 9006 (ECE HB4) lamps marketed by Osram Sylvania Inc. ("OSI") that a cover corresponding to cover 114 is made of a milky plastic, but that when such a cover is prised off from the blind-hole recess it covers, there is present in that recess a quantity of silicone sealant and there is no line of sight or light passageway through the headlamp base. In particular there is no light passageway from the bottom of the headlamp base to the upper region because the opaque plastic of which the base is molded prevents that. Furthermore, on such commercial embodiments, the capsule lead wires (elements 30) protrude through the plastic of the base but do not result in a light passageway, and furthermore the welded junction between the capsule lead wires and the electrical contacts of the plug end (elements 30 and 24), respectively, in Coushaine Pat. '019 also does not result in a light passageway.

SUMMARY

In order to provide a simple and customized appearance to existing motor vehicle lighting, the present disclosure improves upon the lighting apparatus of motor vehicles, such as by emitting chromatic (colored) light from the headlamps of the motor vehicle.

In one embodiment, a solid state light source such as a light-emitting diode (LED) is mounted on a printed circuit board on a housing that bears one or more clips, forming an LED lamp. The clip or clips are configured to be attachable to a conventional capsule-style motor vehicle head headlamp, which bears on an upper surface thereof a conventional tungsten halogen light source. The headlamp is powered conventionally through the chassis wiring harness. The attachable LED lamp is powered through separate electrical leads to provide accent or auxiliary ornamental illumination to a lamp of a motor vehicle is provided by the present disclosure. The term auxiliary in the context of the ornamental lamp preferably connotes a lamp not subject to regulatory requirements. The headlamp, with clipped-on LED accent lamp, is attached in the conventional manner to the rear of the reflector cavity of the vehicle.

In another aspect, a conventional replaceable capsule style vehicle lamp is modified to provide a light passageway, which can be an open through-aperture or a light guide (or light pipe). The light passageway extends from an outer peripheral surface, preferably a lower or bottom surface, of the headlamp, to an exit region that permits the light from the attached solid-state accent light source to pass through the headlamp into the headlamp cavity of the vehicle in order to be projected to the outside of the vehicle. In preferred embodiments the light passageway is a plastics material or glass light pipe held in a bore in the headlamp base with a silicone sealant to prevent moisture penetration past the headlamp into the reflector cavity.

In another aspect, the LED accent light source and the automotive headlamp are brought into mating operative relationship by a lateral motion, which can approximate a translational motion. The LED accent lamp is positionable onto the automotive headlamp by a sliding motion, by application of moderate finger force, in a direction generally perpendicular to the major longitudinal axis of the conventionally-mounted halogen capsule mounted on the automotive lamp; alternatively, the sliding motion can be direction generally parallel the longitudinal axis of the halogen capsule. In an operative condition of the automotive headlamp and attached LED light source mounted to the backside of the reflector cavity, which is accessible through the vehicle's under-hood engine compartment, the LED light source is preferably selectively detachable from the automotive headlamp, by reversing the assembly direction, without having to remove the headlamp away from the reflector.

BRIEF DESCRIPTION OF FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION INCLUDING BEST MODE OF A PREFERRED EMBODIMENT

It may be appreciated that the present disclosure is not limited in its application to the details of construction and the arrangement of components set forth in the following description or illustrated in the drawings. The embodiments herein may be capable of being practiced or being carried out in various ways. Also, it may be appreciated that the phraseology and terminology used herein is for the purpose of description and should not be regarded as limiting as such may be understood by one of skill in the art.

Figure 7:
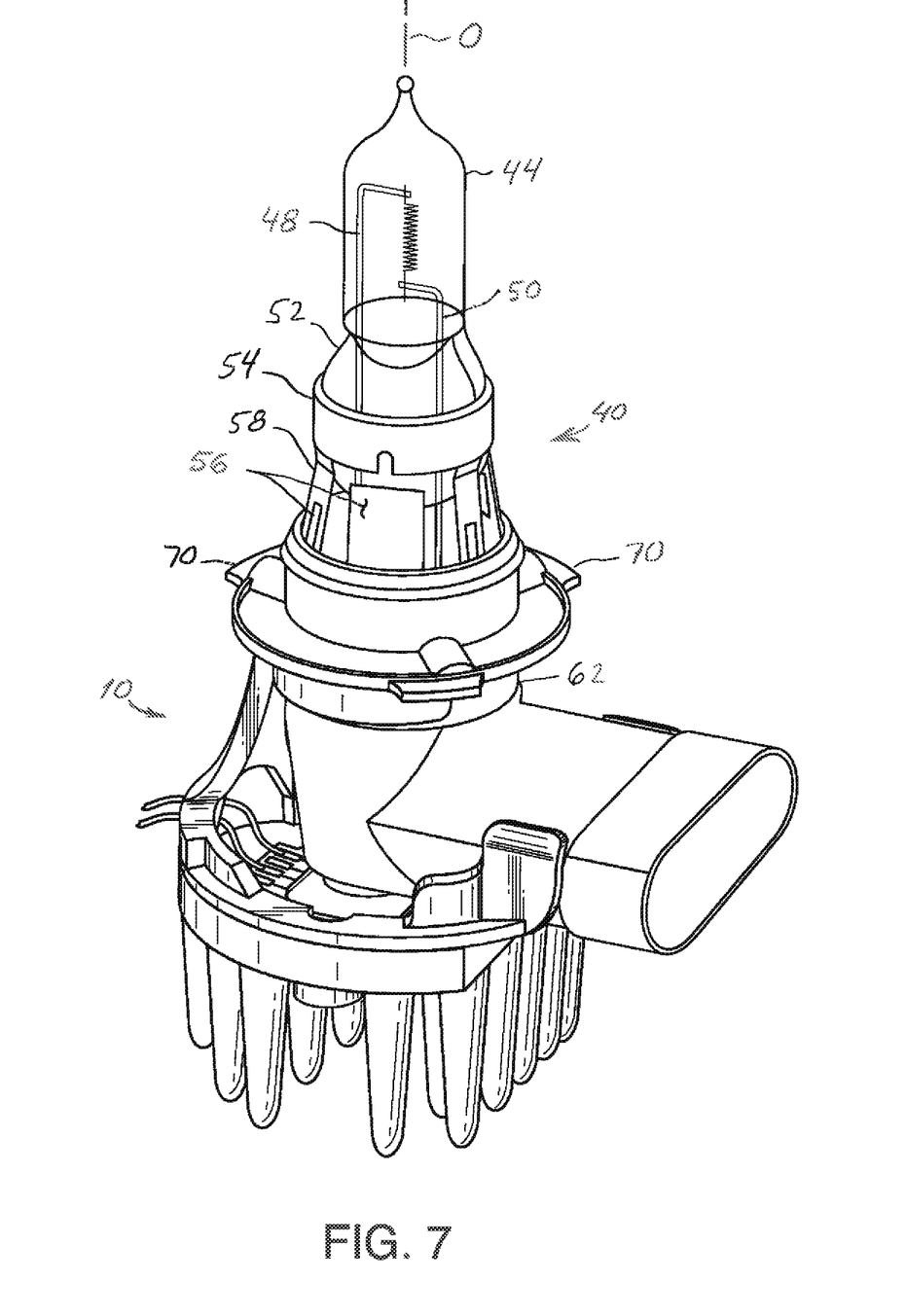
FIG. 7 is a front perspective view of accent lamp 10 attached to headlamp 40.
Figure 11:
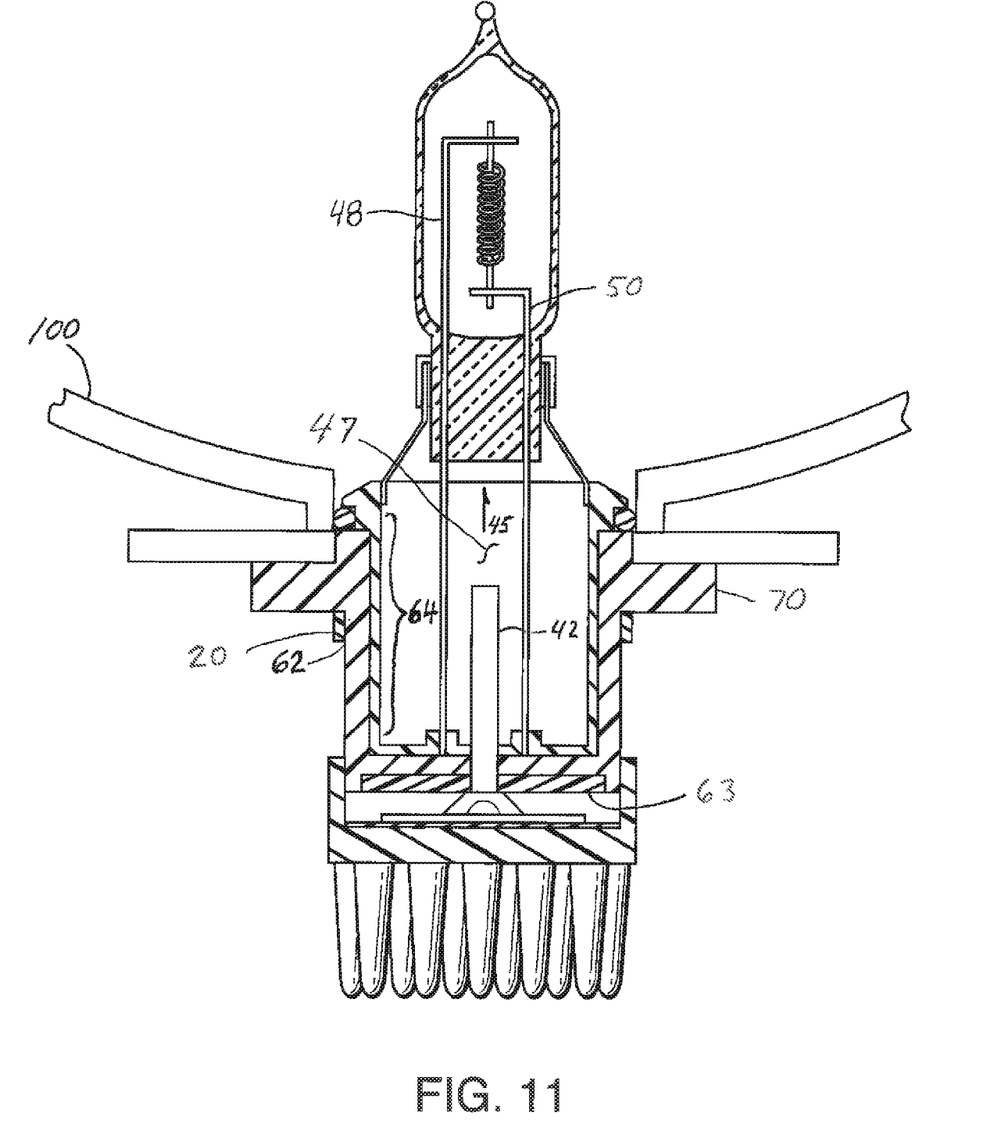
FIG. 11 is a sectional view of accent lamp 10 connected to headlamp 40 which is latched to reflector 100 on the vehicle chassis.

The combination of the automotive headlamp 40 and its associated accent lamp 10 disclosed herein is suitable for use on a motor vehicle, particularly in the reflector cavity for the vehicle forward lighting such as the vehicle headlamp or fog lamp (collectively be referred to herein as a vehicle headlamp) which is used to illuminate a road surface. The type of motor vehicle may include, but is not limited to, a land vehicle such as a passenger sedan, a sport utility vehicle, a minivan, a truck (light or heavy truck) and a recreational vehicle (e.g., ATV, motorcycle, snowmobile). Alternatively the motor vehicle may also include water vehicles (e.g. boats, jet-skis, personal water craft) and air vehicles (e.g. planes, helicopters).

I. The Accent Lamp Component

An accent lamp 10 provides an accent or auxiliary illumination to the motor vehicle. Accent lamp 10 is configured to be arranged adjacent an exterior surface of headlamp 40. Accent lamp 10 provides accent illumination from the headlamp cavity, particularly supplemental ornamental lighting, which may be understood to be lighting provided out of the vehicle's reflector cavity that is alternate to or different from the lighting provided out of the reflector cavity at the time of original manufacture of the motor vehicle.

Referring to FIGS. 1-6, accent lamp 10 has a solid-state light source which may include at least one light-emitting diode ("LED") 4, and may further comprise a plurality of LEDs 4a, 4b, 4c. The LEDs 4 are mounted on a surface such as printed circuit board ("PCB") 8 which contains traces that receive power from electric leads 16. Electrical control to an accent lamp is known in pending U.S. patent application Ser. No. 14/700,435 entitled "Motor Vehicle Accent Lamp and Methods of Use therefor" (naming Weiss, Lessard, Holland, and Landcastle) filed Apr. 30, 2015 by one or more of the inventors of the present application, and is hereby incorporated by reference as if fully set forth herein.

Heat from LEDs 4 is transferred to and otherwise managed by housing 32, which may be formed of metal such as a die-casting. PCB 8 is received in a pocket formed in housing 32. The exterior surface of housing 32 preferably includes a plurality of heat sink fins or pins 14 to dissipate heat from LEDs 4.

In particular, of the plurality of LEDs 4a, 4b, 4c, LED 4a can comprise a red LED, LED 4b can comprise a green LED, and LED 4c can comprise a blue LED. The three LEDs 4a, b, c can be arranged in a triangle, and the center of the triangle can coincide with, a longitudinal axis extending through the center of light guide 42 discussed herein. Within the electromagnetic spectrum, red LED 4a may operate at a wavelength ($\lambda$) in a range of 620 nm to 700 nm, and even more particularly in a range of 620 nm to 645 nm. Green LED 4b may operate at a wavelength ($\lambda$) in a range of 500 nm to 570 nm, and more particularly in a range of 520 nm to 550 nm. Blue LED 4c may operate at a frequency in a range of 450 nm to 500 nm, and more particularly in a range of 460 nm to 490 nm. While discrete red, green and blue LED chips can be used, other chip packages contain all three dies bonded into one chip; RGBW (white) and RGBA (amber) chip combinations can also be used to enhance control. In other embodiments of the present disclosure, the accent lamp 10 may be configured to emit achromatic (white) light, such as for use as daytime running lights.

With regards to maximum intensity, the maximum light intensity emitted from the accent lamp 10 is configured to be lower than the light intensity emitted from fixe low beam or high beam of headlamp 40. For example, a light source 44 for headlamp 40 such as a an HB4/9006 halogen headlamp bulb is designed to emit about 700 lumens on low beam and about 1200 lumens on high beam. In contrast, the maximum light intensity emitted from light-emitting device 4 of each accent lamp 10 is configured to be less than or equal to 300 lumens. For example, the light intensity emitted from light source 4 may range of 5 lumens to 300 lumens, and more particularly in a range of 20 lumens to 250 lumens, and even more particularly in a range of 40 lumens to 100 lumens.

The LEDs 4 may be arranged as part of a light engine, which may comprise an LED driver on PCB 8 to which the LEDs 4a, 4b and 4c are mounted as well as the electrical wiring to provide a signal to those LEDs on color and intensity, as is known in the art and not shown. The LED driver can be mounted on a PCB separate from the PCB on which the LEDs are mounted, or mounted on the same PCB with the LEDs.

The LEDs 4 emit light extending along principal direction P, preferably in a Lambertian distribution having maximum intensity perpendicular to PCB 8 and felling off with increasing angle away from perpendicular. Referring to FIG. 7, in assembled condition, principal direction P is directed similar to axis O of headlamp capsule 44. LEDs 4 are positioned underneath lens 6, which is preferably a collimating lens to promote directing light emitted by accent lamp 10 into light guide 42.

Figure 5:
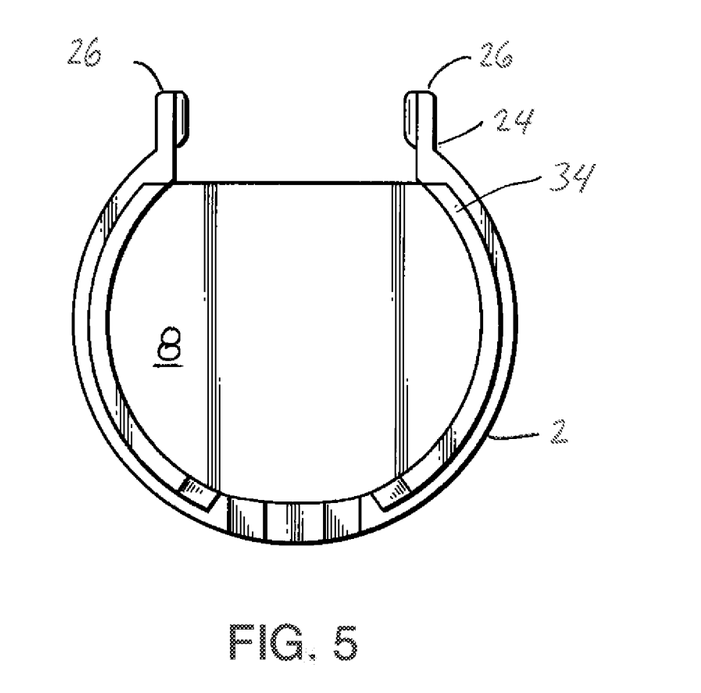
FIG. 5 is a bottom view of base 2 and FIG. 8 of accent lamp 10.
Figure 6:
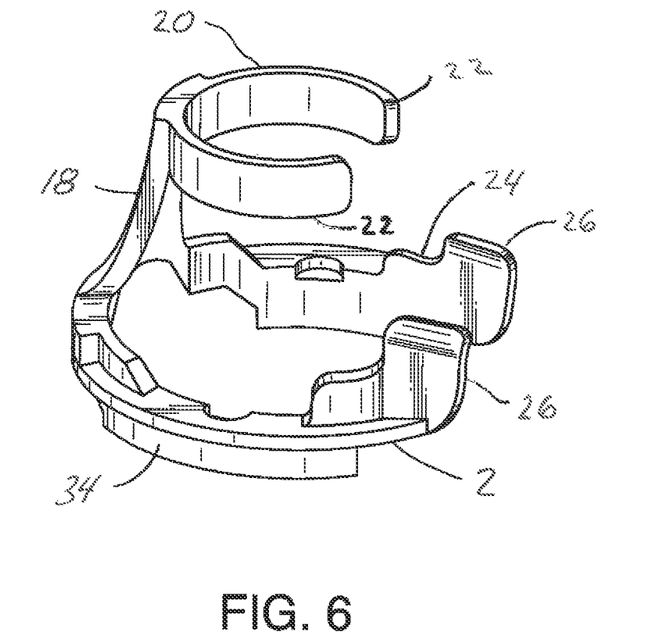
FIG. 6 is a front perspective view of base 2 of accent lamp 10.
Figure 8:
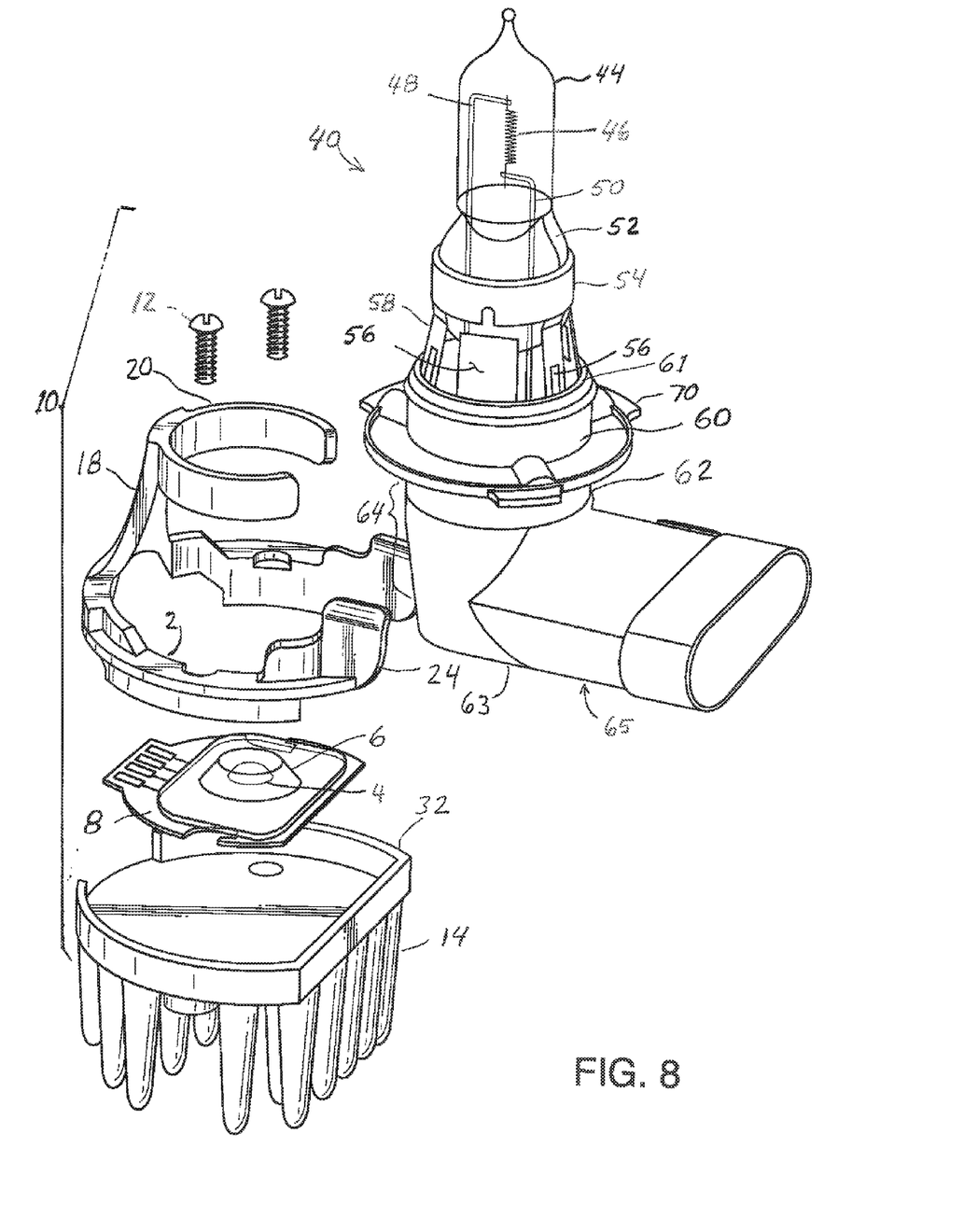
FIG. 8 is an exploded perspective view of components of accent lamp 10, and a perspective view of headlamp 40.

Accent lamp 10 has base 2 which is mounted to housing 32 and secured thereon, such as by fasteners 12, and acts as a cover to retain PCB 8 and lens 6. Referring to FIGS. 5-6 and 8, an underside of base 2 has annular ribs 34 that are received in a pocket in housing 32. Extending upward on resilient post 18 is first retaining member 20 which is located above mounting surface 8. A second retaining member 24 also extends from base 2. Each of first and second retaining members 20, 24 are configured to attach to respective spaced-apart portions of headlamp base 60.

First or second retaining member 20,24 could be an adhesive. First or second retaining member 20, 24 could be a separate component such as a flexible band, a hose clamp, a toggle clamp, or a zip tie or cable tie (such as a cable tie as generally shown in U.S. Pat. No. 5,911,367 (McIenerney)), which during assembly is connected to or around base 2 and headlamp base 60.

Alternatively, and preferably, first and/or second retaining member 20, 24 is formed integrally with base 2, such as molded of a resilient thermoplastics material, such as a nylon or acetal. Preferably first retaining member 20 is a C-shaped first clamp resembling a collar formed by two arms 22. Second retaining member 24 extends from base 2 at a position closer to PCB 8. Second retaining member 24 is also a clamp that has two resilient arms 26. First and second retaining members 20,24 are approximately parallel to each other. The first clamp has two arms 22 that at their free ends are spaced from one another to define a first passageway 28 that is configured to receive the capsule lead-receiving region 64 of headlamp base 60 to which first clamp 20 attaches. The second clamp has two arms 26 that at their free ends are spaced from one another to define a second passageway 30 that is configured to latch onto the vehicle wiring connector-receiving region 65 of headlamp base 60.

Accent lamp 10 may further comprise a power supply (not shown) to supply power to accent lamp 10, which may be electrically coupled thereto by electrical wiring 16. In addition, accent lamp 10 may further comprise a controller (not shown) electrically coupled to the power supply. Among other things, the controller may be used to control the power output emitted from the power supply, particularly based on input received from a user of the accent lamp 10. Such a controller may be located in the passenger compartment of a motor vehicle, such as located on the instrument panel.

The power supply may receive power from a power source, e.g. a car battery, which is electrically coupled thereto by electrical wiring. The power supply may further comprise a housing containing a constant current power supply for exciting the LED chips. The output of the power supply to the accent lamp 10 may be controlled by a feedback loop which includes a sense resistor, which may be located in the accent lamp 10, or any other suitable location. In certain embodiments of the present disclosure, the controller and/or the power source may be included in the power supply, particularly within a housing.

In certain embodiments of the present disclosure, the controller may be a wireless controller configured to receive input (control) signals from a wireless transmitter. The wireless transmitter may comprise computer programming operable on a micro-computer, such as may be provided by a radio, laptop computer, a tablet computer or a smart (cell) phone. The wireless controller and wireless transmitter may communicate wirelessly using Wi-Fi® technology or Bluetooth® technology or other suitable wireless communication technology.

The computer programming may be provided in the form of a computer software application which operates on the micro-computer. The computer software may provide a graphical user interface (GUI) which enables the user to select a color and intensity of chromatic (colored) light to be emitted from the accent lamp 10. Software may run on the receiving end, receiving from the GUI computer, which in turn commands the intensity of each color through a constant current driver circuit.

For example, the graphical user interface may enable the user to select a color from a display of available colors provided on a color palette which enables the user to select a color of the chromatic (colored) light to be emitted from the accent lamp 10. The color palette may make use of an RGB color model. The RGB model may be understood as an additive color model in which red, green, and blue light from the LEDs 4a, 4b and 4c are combined together in various levels to reproduce a broad array of colors. The RGB model may be a true color model which provides, for example, at least 256 shades of red, green and blue for a total of at least 16 million color variations.

The graphical user interface may also enable the user to enter a specific value for each of the red, green and blue shades between 0 and 255 as known in the art, which may be in addition to or alternatively to the color palette. The graphical user interface may also enable the user to enter specific values for HSL (hue-saturation-lightness) and HSV (hue-saturation-value), which may be understood as the two most common cylindrical-coordinate representations of the points in the RGB color model.

In addition to color, the graphical user interface may also enable the user to adjust the output intensity of accent lamp 10 between full intensity and a fraction of full intensity. For example, the graphical user interface may enable the user to adjust the output intensity of accent lamp 10 based on a percentage of full intensity ranging from zero (off) to 100% (full on) in 1% point increments. Use of an 8-bit controller permits adjustment close to 1/255 or nearly 0.5% increments. Thus, for example the graphical user interface may enable the user to adjust the output intensity of accent lamp 10 at 10%, 20%, 30%, 40%, 50%, 60%, 70%, 80%, 90% and 100% of output intensity.

The color and intensity of the illumination emitted from the accent lamp 10 may be derived using pulse width modulation on red LED 4a, green LED 4b and blue LED 4c in a manner known in the art.

II. The Automotive Headlamp Component

The automotive headlamp 40 is of conventional design and construction except that a light passageway 45 has been bored through lamp base 60.

Construction details of a conventional headlamp 40 are shown in each of U.S. Pat. No. 7,008,096 (Coushaine); U.S. Pat. No. 7,261,451 (Coushaine); U.S. Pat. No. 6,080,019 (Coushaine); U.S. Pat. No. 6,270,235 (Coushaine); U.S. Pat. No. 6,254,252 (Coushaine); U.S. Pat. No. 5,696,424 (Coushaine); and US Pat. Pub. US2010/0213815 (Aghamehdi), which are each incorporated hereby in their entirety as if fully set forth herein.

Automotive headlamp 40 is shown in FIGS. 7-11. Headlamp 40 has lamp capsule 44 which contains a light source 46, such as a tungsten halogen filament capsule. Headlamp 40 generally provides achromatic ("white") light. A chromatic light is understood to be light which is color neutral to the naked human eye. Capsule electric leads 48, 50 extend through press seal end 52 to power the filament Lamp capsule 44 is arranged on headlamp base 60 with its capsule major longitudinal axis O extending perpendicularly away from upper surface 61 of headlamp base 60. Retainer 54 grasps press seal 52 in a known manner. Retainer 54 may also include brackets or legs 58, which may be formed of sheet metal. Retainer 54 connects lamp capsule 44 to headlamp base 60. Brackets 58 have slots formed therein and/or spaces between adjacent brackets 58 that define apertures 56. Apertures 56 form light exit regions for light emitted by accent lamp 10 when it is coupled to headlamp 40.

Headlamp base 60 has upper surface 61 and a lower surface 63. Lower surface 63 is formed on an outer, peripheral surface of headlamp base 60. Lower surface 63 is preferably a bottom surface of headlamp base 60.

Figure 9:
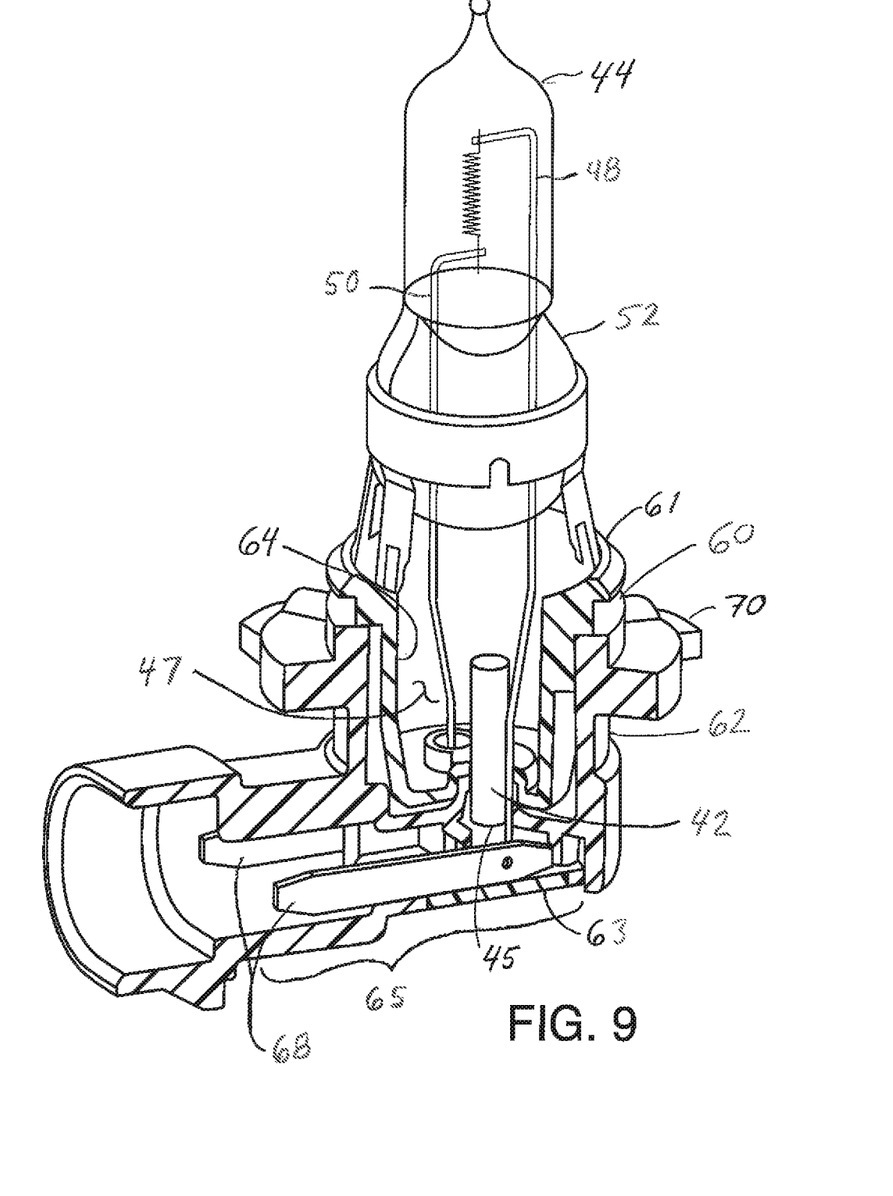
FIG. 9 is a partial cut-away perspective view from the rear of headlamp 40 showing light guide 42.

Referring to FIGS. 8, 9 and 11, headlamp base 60 has capsule lead-receiving region 64 into which electric leads 48, 50 extend from capsule 44. Headlamp base 60 further has contacts 68, 68 which are in vehicle wiring connector-receiving region 65. Contacts 68, 68 are electrically connected to capsule leads 48, 50, as seen in FIG. 9, such as by welding, in order to provide electrical connection to the wiring harness which is part of the motor vehicle. Referring to FIGS. 7-9, capsule lead-receiving region 64 is generally transverse to vehicle wiring connector-receiving region 65, such that headlamp base 60 is generally L-shaped. The capsule electric leads 48, 50, at least within lead-receiving region 64, are approximately transverse to electrical contacts 68.

Figure 12A:
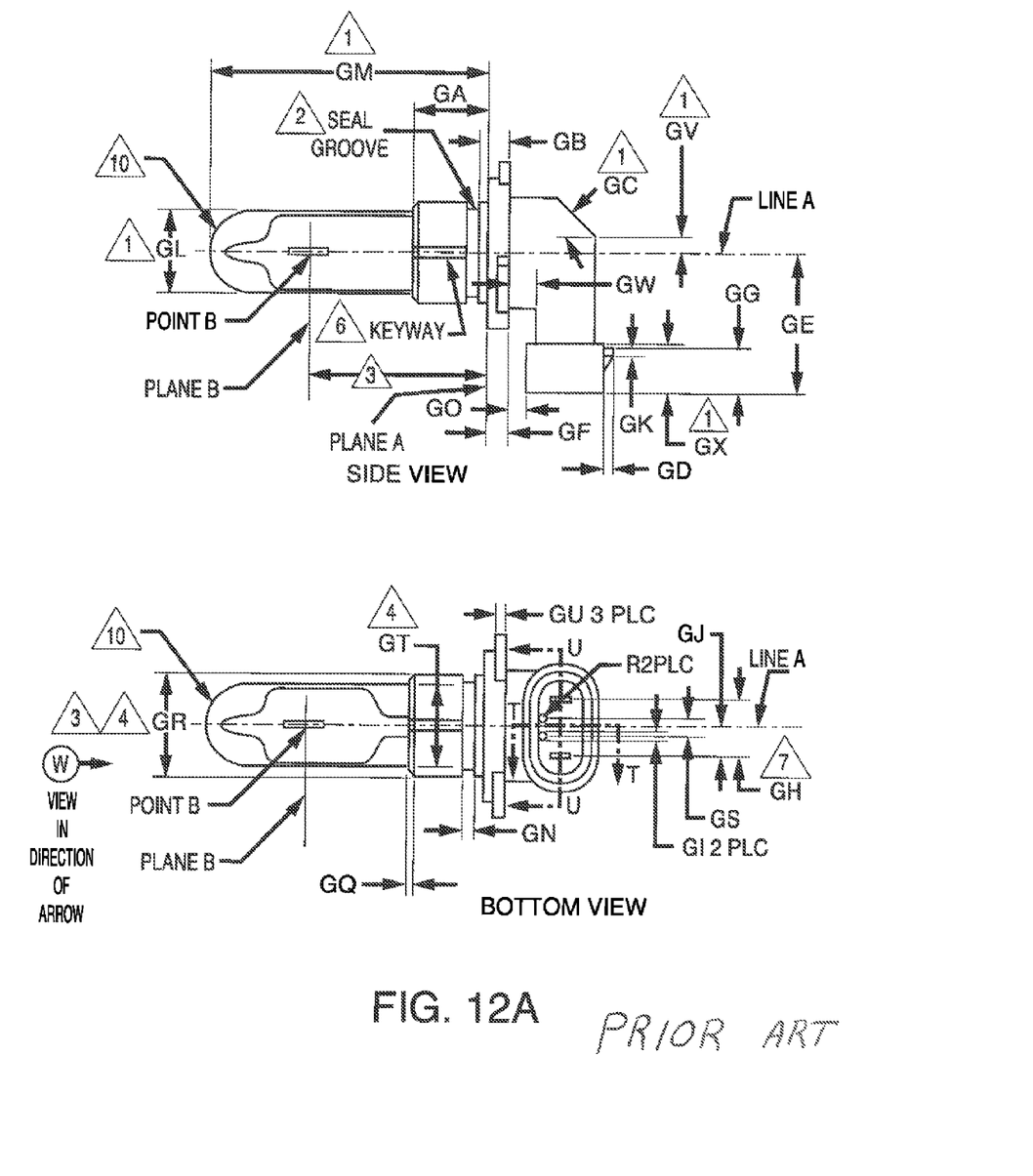
FIGS. 12A and 12B is an excerpt from the Prior Art document SAE (Society of Automotive Engineers) J2560 Issued July 2007.
Figure 12B:
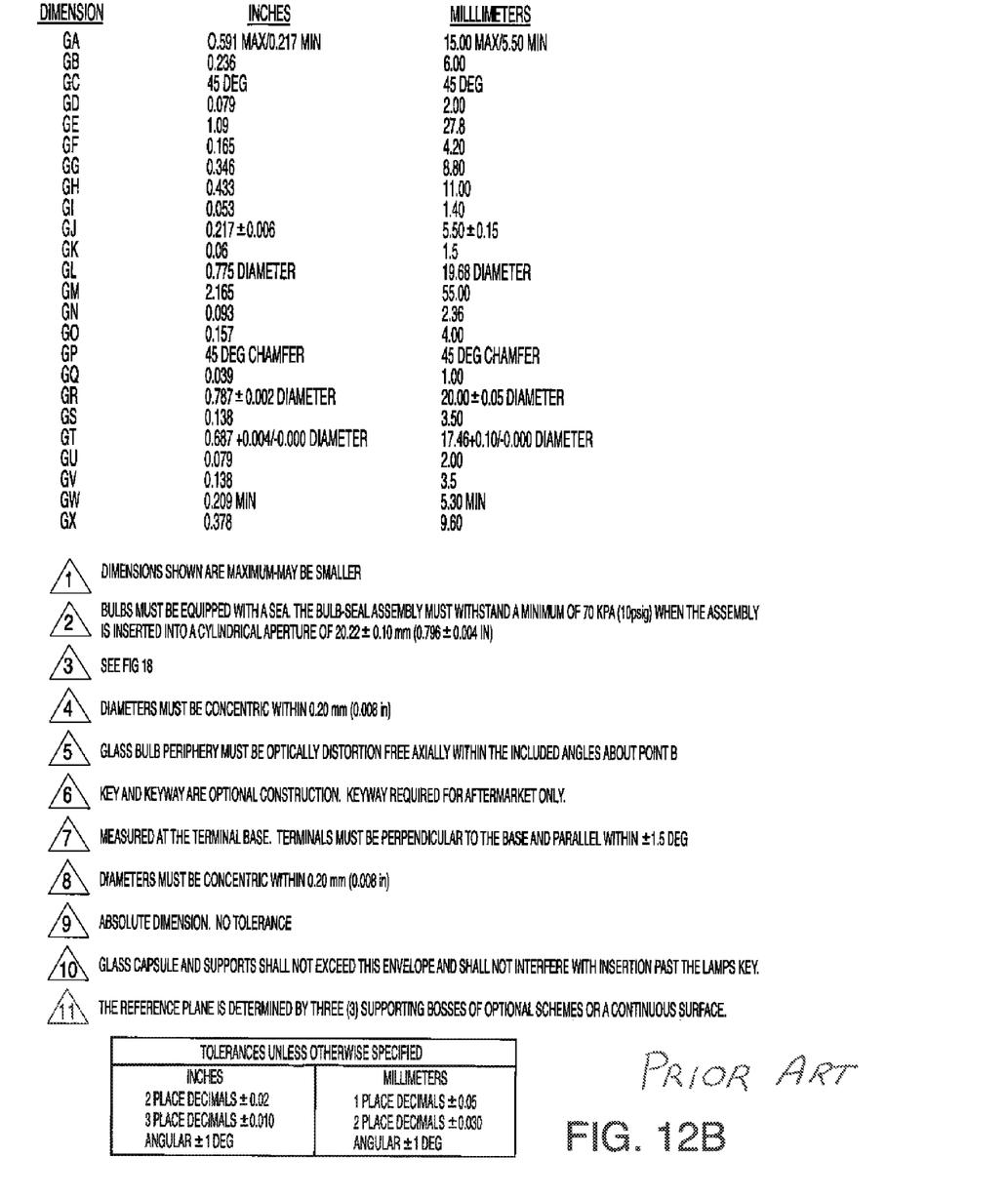

Referring to FIGS. 12A, 12B there is shown an excerpt from an SAE (Society of Automotive Engineers) technical specification. SAE Document J2560 at pages 41-56 (issued July 2007) is incorporated hereby in its entirety as if fully set forth herein. An excerpt shown in FIGS. 12A, 12B contains specifications of a 9005 bulb, depicting a suitable L-shaped headlamp base 60, which fits within the spatial envelope of bulbs designated as SAE-9005, SAE-9006, SAE-9145, SAE-9140, SAE-9155, SAE-9040, SAE-9045, SAE-9055, EC-HB3, EC-HB4, or EC-HB10.

Referring to FIGS. 7 and 11, headlamp base 60 includes locking tabs 70 to make connection to reflector 100, as is known in the art by linear insertion followed by a turn of headlamp 40 about capsule axis O.

Referring to FIGS. 7, 9 and 11, headlamp base 60 can have circumferential groove 62 which helps receive and seat collar-like dip 20 of accent lamp 10.

Referring to FIGS. 9 and 11, headlamp base 60 defines, on an interior region thereof, a cavity 47 underneath lamp capsule 44 which defines a light passageway 45. Light passageway 45 extends from an aperture in outermost peripheral surface 63, which is preferably a bottom surface, to upper surface 61. Light passageway 45 adjacent to peripheral surface 63 forms a light entrance window at peripheral surface 63, so that light which enters from a region external of headlamp 40, i.e. from accent lamp 10, is directed toward an underside of press seal 52 and/or to light exit apertures 56.

Light passageway 45 could be an open bore, which might be acceptable in dry climates, but in humid conditions that could permit entry of moisture into the vehicle headlamp reflector cavity which could deposit on reflector 100. In order to better seal the vehicle reflector cavity, and to guide the light from accent lamp 10, a light guide 42 is positioned in light passageway 45. Light guide 42 is optically transmissive to wavelengths of light from solid state light source 4. Light guide 42 can be made of a plastics material, a glass such as quartz glass, or optical grade silicone. If light guide 42 is made of a plastics or glass, it is helpful to apply silicone sealant between light guide 42 in light passageway 45 to inhibit moisture entry. Light guide 42 is preferably a solid rod, preferably cylindrical. Light guide 42 closes off light passageway 45 at the light entrance window at peripheral surface 63, but does not need to physically occupy an entire length of light passageway 45. Light guide 42 is aligned with central axis O of lamp capsule 44. Light guide 42 extends into cavity 47 but does not need to extend up to the height of upper surface 61 of headlamp base 60, but rather its length can end below it; this can encourage injecting light not only into press seal region 52 but also to reflect off of press seal 52 and the sheet metal of which retainer 54 and bracket 58 are formed. Referring to FIG. 11, capsule electric leads 48,50 are spaced laterally from a path light emitted from accent lamp 10 would traverse through light passageway 45, or light guide 42, to avoid interfering with the light path.

Figure 10:
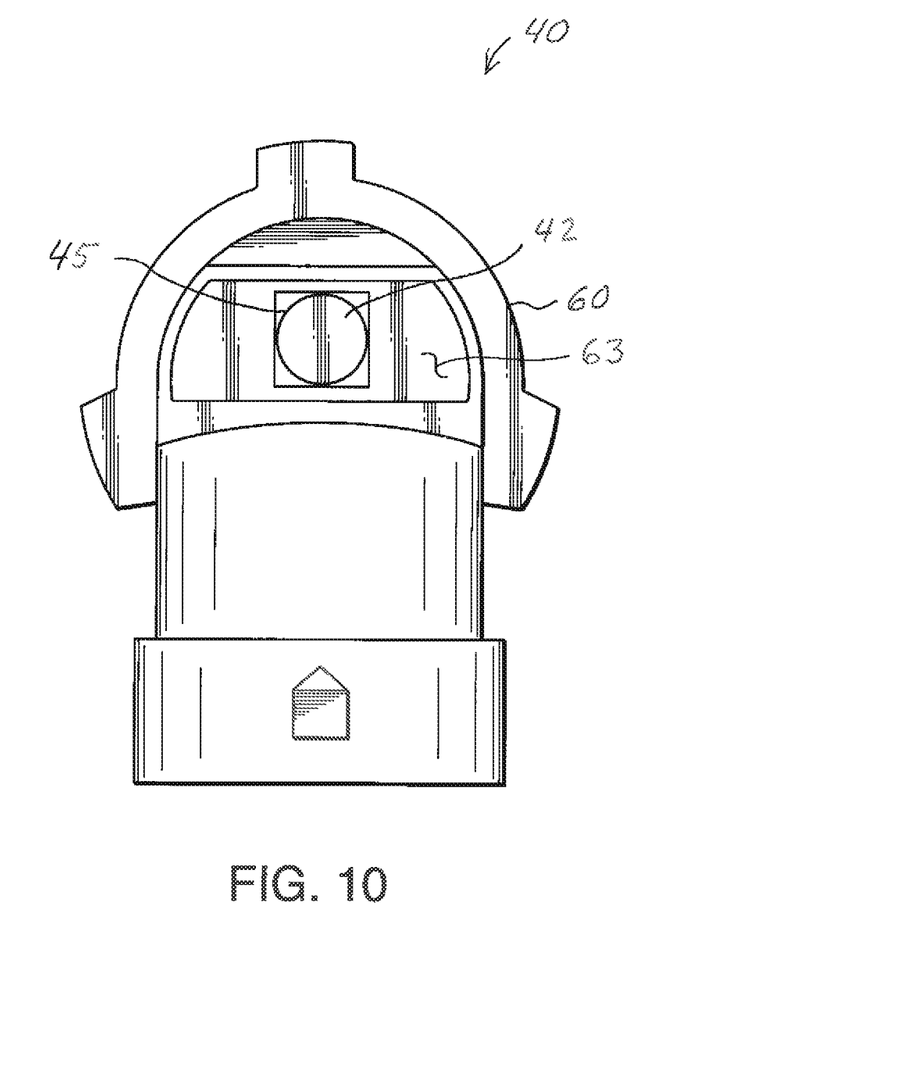
FIG. 10 is a bottom view of headlamp 40 including light guide 42.

Referring to FIG. 10-11, light guide 42 at light entrance window is preferably flat, which promotes good optical coupling to an upper surface of lens 6 when accent lamp 10 is coupled to headlamp 40. Optionally, light guide 42 is flush with peripheral surface 63.

Light passageway 45 is preferably straight, and extends from bottom surface 63 to direct light toward upper surface 61. If light passageway 45 were not straight, for example if external light entered a light entrance window on a lateral side surface of headlamp base 60 near groove 62, then manipulation of light with a reflector or curved light guide would route the light from accent lamp 10 toward the exit of light passageway 45 near upper surface 61 so that the light from accent lamp 10 would strike near an underside of press seal 52 and exit at light exit regions 56 in retainer 58. Such an arrangement could be used to couple accent lamp 10 to an automotive lamp having a straight, rather than L-shaped, base, such as for example with an automotive lamp of the type marketed under the SAE designation 9004 (ECE HB1), an example of which is depicted at FIG. 7 in Coushaine U.S. Pat. No. 6,080,019, since the vehicle wiring harness is plugged onto the lower end below and opposite the press seal region.

III. Operative Association

Referring to FIGS. 1-7, first and second retaining members 20, 24 are approximately parallel to each other. The first clamp has two arms 22 that at their free ends are spaced from one another to define a first passageway 28 that is configured to receive an exterior surface of the capsule lead-receiving region 64 of headlamp base 60 to which first clamp 20 attaches. The second clamp has two arms 26 that at their free ends are spaced from one another to define a second passageway 30 that is configured to latch onto the vehicle wiring connector-receiving region 65 of headlamp base 60.

Figure 2:
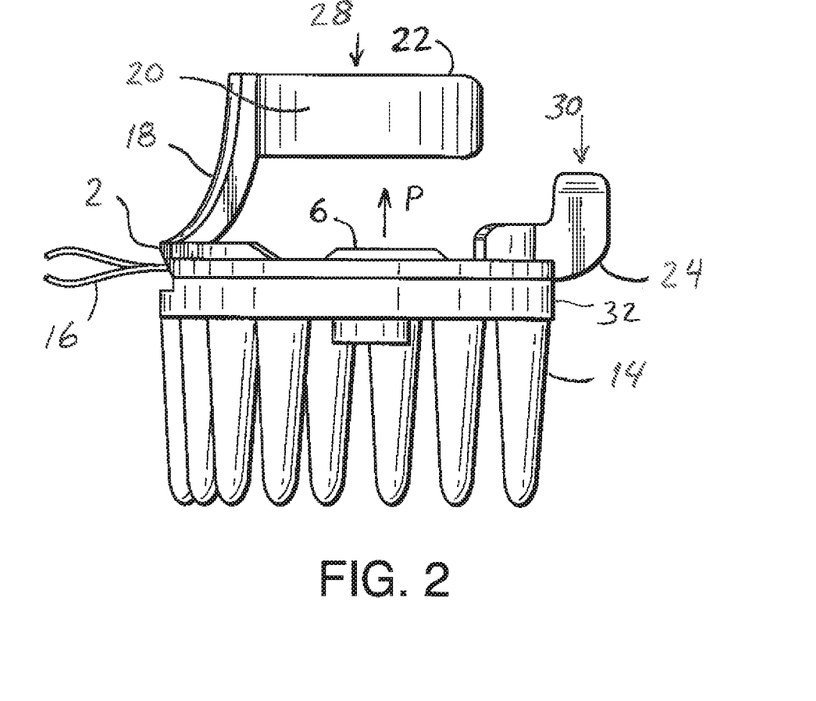
FIG. 2 is a side elevational view of accent lamp 10.
Figure 3:
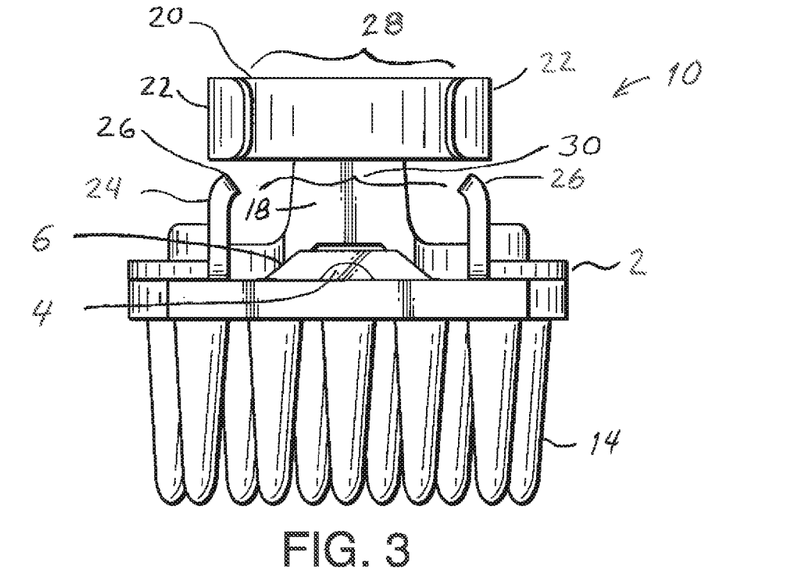
FIG. 3 is a front view of accent lamp 10.
Figure 4:
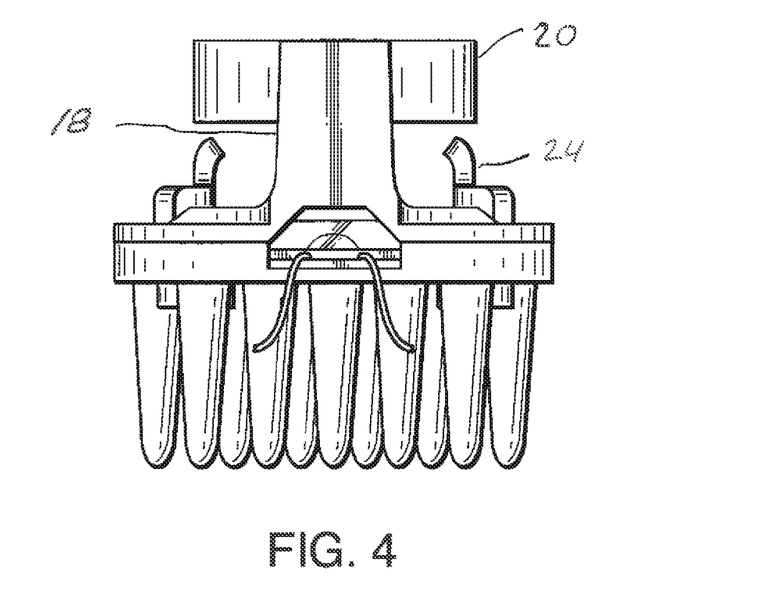
FIG. 4 is a rear view of accent lamp 10.

Referring in particular to FIG. 2, resilient post 18 permits the collar formed at first retainer damp 20 to pivot slightly, in the manner of a cantilever beam, approximately about the region where post 18 joins base 2, towards and away from PCB 8. In an assembled condition of FIG. 7, second retaining member 24 locks onto the connector-coupling region 65 of headlamp base 60, then the action of coupling first retaining clamp 20 around groove 62 causes post 18 and first retaining member 20 to be deflected slightly from its neutral position, thus urging accent lamp 10 and headlamp 40 into closer connection. This results in promoting orientation of the parts and biasing an upper surface of lens 6 and a light entrance window of light guide 42 towards one another, preferably into flush mating contact.

Figure 1:
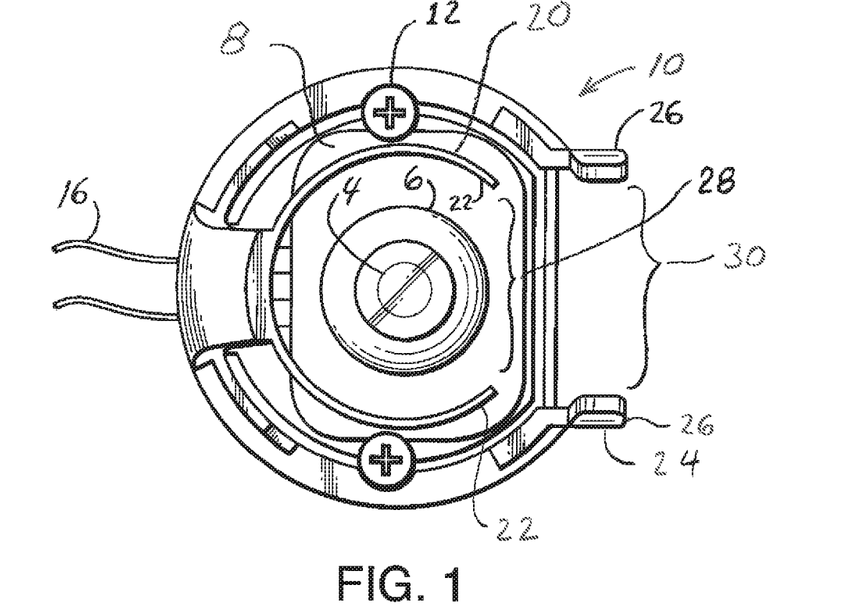
FIG. 1 is a top view of accent lamp 10, according to the present disclosure.

First and second passageways 28, 30 for introduction of headlamp 40 are open both from a lateral side, as shown in top view of FIG. 1, and open in a direction extending vertically away from PCB 8, as shown in side view of FIG. 2.

Referring in particular to FIGS. 7-8, to effect assembly, accent lamp 10 is easily, by application of moderate finger force, tilted slightly relative to headlamp 40 to hook arms 26 of second passageway opening 30 over an upper surface of wiring connector-receiving region 65 of headlamp 40, and then slid in an approximately translational motion perpendicular to capsule major axis O, whereupon some slight resistance is encountered at first passageway opening 28 due to a separation distance between arms 22,22 being chosen smaller than an outer surface of capsule lead-receiving region 64 such as diameter of groove 62, and overcoming this resistance allows first retaining member 20 to clamp to groove 62. This positioning can also bias resilient post 18 to promote optical coupling of light source 4 to light guide 42.

Alternatively, accent lamp 10 can be introduced onto headlamp 40 in a direction generally parallel capsule major axis O by tilting peripheral surface 63 to introduce a region of headlamp base 60 adjacent light guide 42 down between aims 22 of first retainer member 20 to pass through first passageway 28 and then translating headlamp 40 downward so that wiring connector-receiving region 65 prises open resilient arms 26, also resulting in the assembled condition of FIGS. 7, 11 and promoting optical coupling.

Due to the simple assembly direction, accent lamp 10 can be mounted to headlamp 40 either before or after headlamp 40 is mounted into vehicle headlight cavity by mating it with tabs 70 to vehicle-mounted reflector 100 through an opening accessed via the vehicle engine compartment. Accent lamp 10 is, when desired for replacement of accent lamp 10 or of headlamp 40, selectively readily detachable from headlamp 40, such as for repair, servicing or relamping.

While a preferred embodiment of the present disclosure has been described, it should be understood that various changes, adaptations and modifications can be made therein without departing from the spirit of the disclosure and the scope of the appended claims. The scope of the disclosure should, therefore, be determined not with reference to the above description, but instead should be determined with reference to the appended claims along with their full scope of equivalents. Furthermore, it should be understood that the appended claims do not necessarily comprise the broadest scope of the disclosure which the applicant is entitled to claim, or the only manner in which the disclosure may be claimed, or that all recited features are necessary.

What is claimed is:

1. A combination automotive headlamp and an external attachable light source, comprising:
    a headlamp (40) comprising
        a lamp capsule (44) adapted to generate light;
        a headlamp base (60) including an upper surface (61), an outermost peripheral surface (63), a capsule lead-receiving region (64), and a vehicle wiring connector-receiving region (65);
        a retainer (54) affixed to the lamp capsule (44) and interconnecting the headlamp base (60) and the lamp capsule (44), the retainer (54) defining at least one light exit region (56) at a location between the upper surface (61) and the lamp capsule (44); and
        the headlamp base (60) further defining a cavity (47) therein disposed underneath the lamp capsule (44) and defining a light passageway (45) extending between the outermost peripheral surface (63) and the upper surface (61), the light passageway (45) defining a light entrance window at the outermost peripheral surface (63); and
    an accent lamp (10) attachable to the automotive headlamp base (60), the accent lamp comprising
        a base (2);
        a solid state light source (4) disposed on the base (2); and
        a first retaining member (20) disposed on the base (2) and adapted to attach to a first portion of the headlamp base (60);
    whereby the solid state light source (4) is optically coupled to the light entrance window of the headlamp base.

2. The lamp combination of claim 1, wherein the first retaining member (20) comprises a flexible band.

3. The lamp combination of claim 2, wherein the flexible band comprises a cable tie.

4. The lamp combination of claim 1, wherein the first retaining member (20) is configured to be attachable and selectively detachable to the headlamp base (60).

5. The lamp combination of claim 1, wherein the accent lamp base (2) comprises a second retaining member (24) disposed on the base in spaced relation to the first retaining member (20),
    the first retaining member (20) being configured to attach to an outer surface of the capsule lead-receiving region (64) of the headlamp base (60), and
    the second retaining member (24) being configured to attach adjacent the vehicle wiring connector-receiving region (65).

6. The lamp combination of claim 5, wherein the capsule lead-receiving region (64) and the wiring connector-receiving region (65) are generally perpendicular one another.

7. The lamp combination of claim 1, wherein the first retaining member (20) is resiliently supported relative the base (2) on which it is disposed, whereby, in a condition of the accent lamp (10) being attached to the headlamp (60), the solid state light source (4) is biased towards the light entrance window.

8. The lamp combination of claim 1, wherein
    the accent lamp base (2) comprises a second retaining member (24) disposed on the base in spaced relation to the first retaining member (20); and
    the first retaining member (20) and the second retaining member (24) each comprising clamps having respective openings defining respective headlamp introduction passageways (28, 30), the passageways being generally aligned, thereby facilitating a generally lateral introduction of the accent lamp (10) onto the headlamp (40).

9. The lamp combination of claim 1, wherein the lamp capsule (44) comprises a press seal end (52) with at least one electric lead (48) extending through the press seal (52), and the retainer (54) is affixed to the press seal end (52).

10. The lamp combination of claim 1, wherein the solid state light source (4) further comprises a collimating lens (6).

11. The lamp combination of claim 1, wherein the headlamp base (60) conforms to a spatial envelope of a lamp chosen from the group of lamps consisting of the types SAE-9005, SAE-9006, SAE-9145, SAE-9140, SAE-9155, SAE-9040, SAE-9045, SAE-9055, EC-HB3, EC-HB4, and EC-HB10.

12. The lamp combination of claim 1 in combination with an accent lamp (10) comprising a solid state light source (4) disposed on a substrate (8) provided with electrical traces, the accent lamp (10) being coupled to the outermost peripheral surface (63) and configured to direct light emitted from the accent lamp (10) into the light passageway (45).

13. The lamp combination of claim 1, further comprising a controller coupled to a power supply to adjust at least one of a light color and a light intensity provided from the solid state light source.

14. A method of attaching an accent lamp to an automotive headlamp, comprising:
    providing a headlamp (40) comprising
        a lamp capsule (44);
        a headlamp base (60) defining an upper surface (61) to which the lamp capsule (44) is retained, the headlamp base (60) further defining a light passageway (45) therethrough extending from a light entrance window located at an outermost peripheral surface (63) of the headlamp base (60) to a light exit at the upper surface (61);
    providing an accent lamp (10) comprising a solid'state light source (4) disposed on a base (2);
    positioning the accent lamp (10) external the headlamp base (60); and
    orienting an emission region of the solid state light source (4) towards the light entrance window.

15. The method of claim 14, further comprising biasing the solid state light source (4) to the light entrance window.

16. The method of claim 14, further comprising
    providing first and second retaining members (20, 24) on the accent lamp base (2), the second retaining member (24) being spaced from the first retaining member (20), each retaining member (20, 24) being adapted to attach to respective regions of the headlamp base (60);

biasing the first retaining member (20) relative the base (2) of the accent lamp (10);

attaching the second retaining member (24) to the headlamp base (60); and attaching the first retaining member (20) to the headlamp base (60) and thereby urging the accent lamp (10) toward the headlamp base (60).

17. The method of claim 14, further comprising providing first and second retaining members (20, 24) on the accent lamp base (2), the second retaining member (24) being spaced from the first retaining member (20), each retaining member (20, 24) having respective openings defining respective headlamp introduction passageways (28, 30), the openings being aligned in generally a common direction; and attaching the first and second retaining members (20, 24) to the headlamp base (60) comprises introducing the headlamp generally laterally toward the headlamp introduction passageways (28, 30).

18. The method of claim 17, wherein the lamp capsule has a capsule major longitudinal axis (O), and the introducing the headlamp laterally comprises laterally moving generally perpendicular to the capsule major longitudinal axis.

19. The method of claim 17, wherein the lamp capsule has a capsule major longitudinal axis (O), and the introducing the headlamp laterally comprises laterally moving generally parallel the capsule major longitudinal axis.

* * * * *